No. 829,204. PATENTED AUG. 21, 1906.
E. B. HACKBURN, W. C. WILLETT & D. F. DEPPE.
PLANTER.
APPLICATION FILED APR. 19, 1905.
3 SHEETS—SHEET 1.
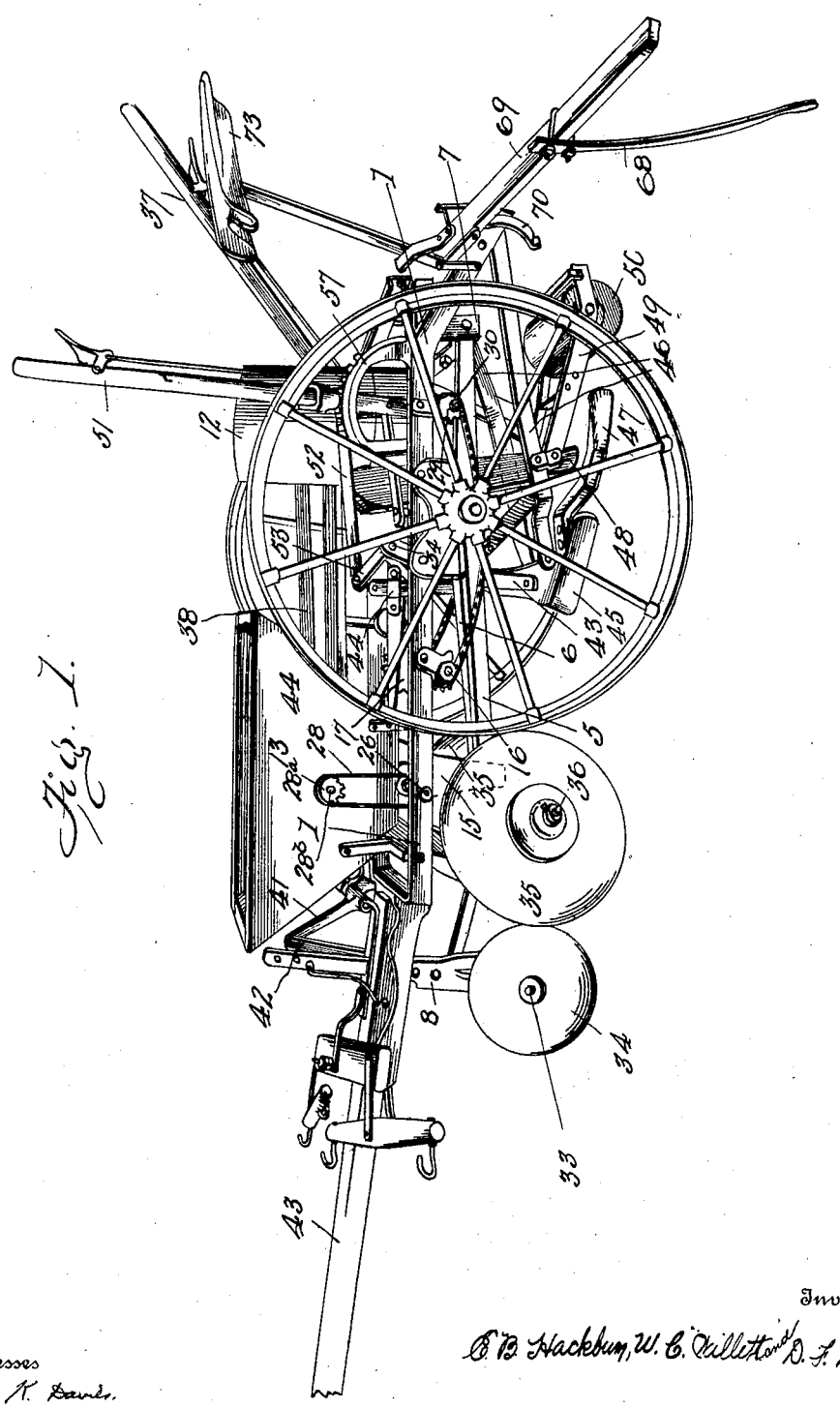

No. 829,204. PATENTED AUG. 21, 1906.
E. B. HACKBURN, W. C. WILLETT & D. F. DEPPE.
PLANTER.
APPLICATION FILED APR. 19, 1905.
3 SHEETS—SHEET 2.
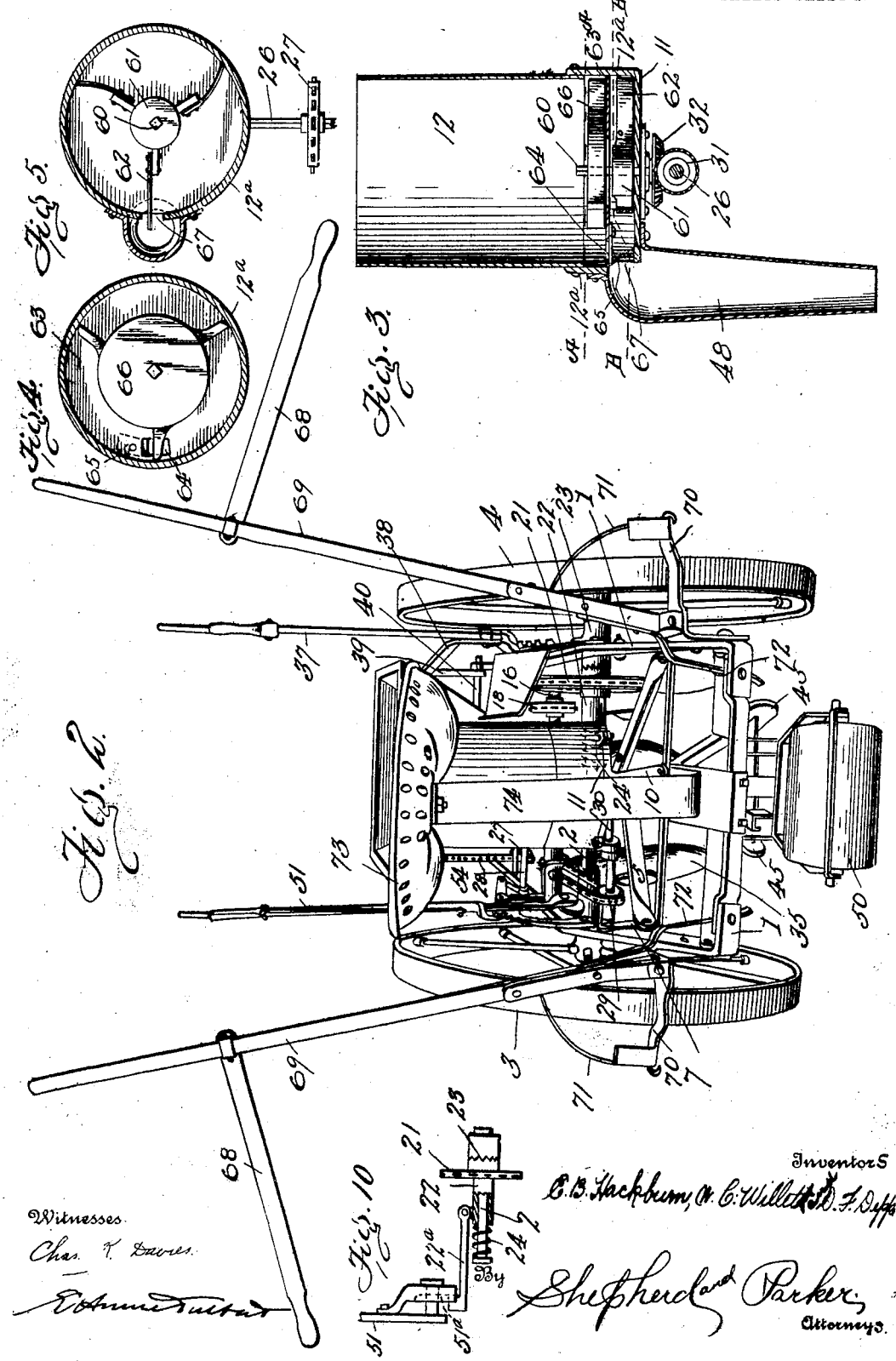
Witnesses
Chas. T. Davies
Inventors
E. B. Hackburn, W. C. Willett, D. F. Deppe
By Shepherd and Parker
Attorneys

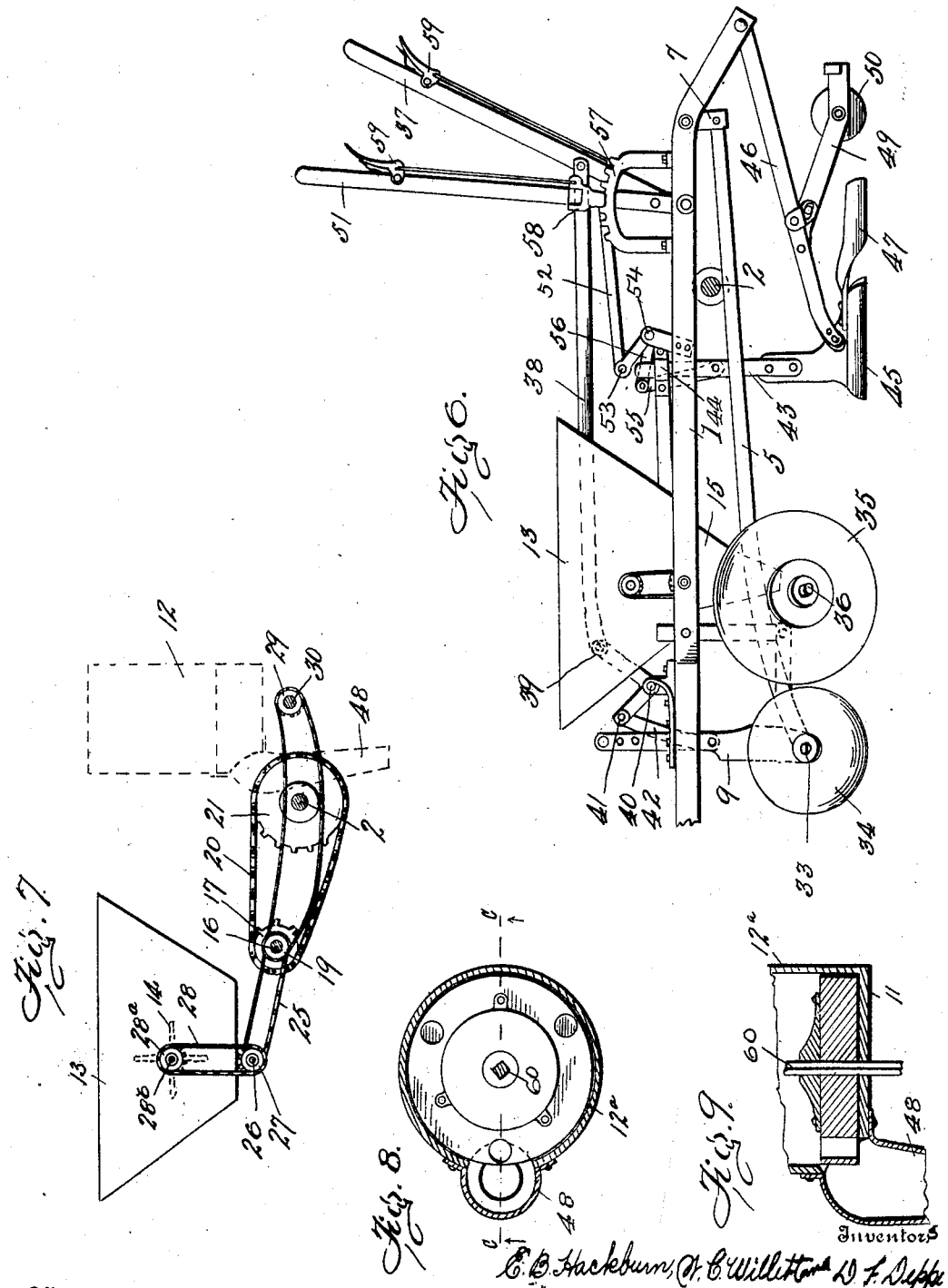

UNITED STATES PATENT OFFICE.

EPHRAIM B. HACKBURN, WILLIAM C. WILLETT, AND DENNIS F. DEPPE, OF NEWBERN, NORTH CAROLINA.

PLANTER.

No. 829,204.           Specification of Letters Patent.           Patented Aug. 21, 1906.

Application filed April 19, 1905. Serial No. 256,348.

*To all whom it may concern:*

Be it known that we, EPHRAIM B. HACKBURN, WILLIAM C. WILLETT, and DENNIS F. DEPPE, citizens of the United States, residing at Newbern, in the county of Craven and State of North Carolina, have invented certain new and useful Improvements in Planters, of which the following is a specification.

Our invention relates to planters, and to that particular class used for planting cotton-seed and corn.

The object of our invention is to provide a planter which can be used for planting cotton-seed or corn, the only change of parts necessary being the substitution of one set of dropper-plates for another.

With this and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a side view of the planter, showing one of the markers in its lower or operative position. Fig. 2 is a rear view of the planter, showing both markers raised. Fig. 3 is an enlarged sectional view of the cotton-seed hopper. Fig. 4 is a horizontal cross-section of the same through line A A, Fig. 3. Fig. 5 is a similar view through line B B, Fig. 3. Fig. 6 is a side view of the planter, showing the connection of the levers, which operate to raise and lower the several parts of the turning mechanism. Fig. 7 is a side view showing how power is transmitted to the agitators and seed-droppers. Fig. 8 is a horizontal cross-section of the corn-dropper. Fig. 9 is a vertical section of the same through line C C of Fig. 8, and Fig. 10 is a detail view of the clutch-operating mechanism.

In the drawings, in which like numerals indicate corresponding parts throughout the several views, 1 designates the main frame of the planter, which we prefer to construct of iron. To this frame is journaled axle 2, carrying on its outer end wheels 3 and 4. Angle-irons 5 and 6 are pivoted at their rear ends to the vertical portions of rod 7, said rod being secured to the sides of frame 1. The forward ends of angle-irons 5 and 6 are secured to castings 8 on the lower end of adjustable hangers 9. To the center of rod 7 are bolted supports 10, which are connected with the bottom of the seed-hopper 12. The fertilizer-hopper 13 is secured to the forward part of the frame and is provided with stirrers 14 and spout 15. A shaft 16 is mounted in the frame between axle 2 and fertilizer-hopper, keyed to which are three sprockets 17, 18, and 19. Sprocket 17 is connected by chain 20 to the main sprocket-wheel 21, which is fixed on sleeve 22. This sleeve is slidably mounted on the axle 2 and provided with teeth on its outer face, which are adapted to engage on the adjacent face of hub 23 of wheel 4. These faces are kept in engagement by a coil-spring 24, encircling axle 2, said spring being adapted to exert a pressure against the end of sleeve 22.

Chain 25 connects a sprocket-wheel 18 to a sprocket-wheel (not shown) on shaft 26, said shaft being mounted under the fertilizer-hopper. This shaft also carries a sprocket-wheel 27, which operates through chain 28 to revolve stirrers 14 in hopper 13. Sprocket 19 connects with sprocket 29, which is carried by shaft 30, said shaft being provided with journals secured to the frame 1 and the bottom of the seed-hopper. On the end of this shaft is a beveled gear 31, meshing with a similar gear 32, keyed to a shaft 60, mounted in the bottom of the seed-hopper. Through these gears motion is transmitted to the movable parts of the seed-dropper, a description of which will be hereinafter given.

Mounted on stub-shafts 33, secured to angle-irons 5 and 6, are opening-disks 34, adapted to open the furrow for the reception of its fertilizer. There are two of these opening-disks and also two covering-disks 35, mounted on stub-shafts 36, which are also secured to angle-irons 5 and 6 and are adapted to cover the fertilizer and list the land a little higher than the surface. These opening and covering disks may be raised above the ground by the following mechanism: Lever 37, pivoted at its lower end to frame 1, is connected by rod 38 to arm 39, which is fixed to rock-shaft 40. Arm 41 is also fixed to shaft 40 and has pivoted to it a rod 42, which is connected to the lower part of hanger 9, said hanger being vertically movable through a slot in the tongue 43. When the lever 37 is moved backward, the rod 38 operates through arm 39 to rock shaft 40 and raise arm 41. By this means the rod 42, which is attached to arm 41, lifts the forward ends of angle-irons 5 and 6, together with the opening and covering disks attached thereto.

Hanger 43 is vertically movable in guide 44 and has secured to its lower end a V-shaped sweep 45, the apex or front of which forms an opener. Rods 46 are pivoted at their rear ends to the sides of frame 1, their front ends being secured in a like manner to the lower part of hanger 43. Covering-arms 47 are attached to the sweep-blades and operate to drag on each side of the trench and throw the dirt over the seed which is delivered from the hopper 12 through spout 48, located between the coverers and the sweep. Mounted in a frame 49 is a roller 50, which packs the earth over the seed in order that moisture may be retained. The frame 49 is secured to rods 46 and may be lifted from the ground, together with the sweep and coverers, by the operation of lever 51, pivoted to frame 1. Connected to this lever is a rod 52, which also connects with arm 53, fixed on rock-shaft 54. To the hanger 43 the lower end of rod 55 is pivotally attached. The upper end of the rod is secured in a similar manner to the arm 56, fixed on shaft 54. This construction will operate upon moving lever 51 backward to lift the sweep, coverers, and roller, as above stated. A cam-face 51$^a$, (see Fig. 10,) provided on the ends of lever 51, engages a projection on rod 22$^a$. This rod is connected to sleeve 22 and operates to disengage the clutch when drawn back by cam-face 51$^a$. In order to hold the parts controlled by levers 37 and 51 in the desired position, racks 57 and dogs 58 are provided, said dogs being connected to hand-levers 59, which are adapted to release them.

While any style of seed-droppers may be used in connection with this planter, we prefer those shown in the drawings. In the cotton-seed dropper illustrated in Figs. 3, 4, and 5, 12 indicates the sheet-metal hopper, having a cast-iron bottom portion 12$^a$. Journaled in the center of the bottom 11 is a short shaft 60, having an angular portion extending upward into the hopper 12. Mounted to revolve with the shaft 60 is a hub 61, having resilient wings 62 of a length greater than the diameter of the hopper. These wings are swung backward by the sides of the hopper. A disk 63 rests upon lugs on the sides of the bottom portion 12$^a$ and is prevented from rotary movement by any suitable means. This disk is provided with an opening 64, having a regulating-slide 65. Resting on disk 63 is an agitator 66, rotated by shaft 60, said shaft having keyed to its lower end a gear 32, meshing with gear 31, as before described. Spout 48 is bolted to the bottom portion 12$^a$ and communicates therewith through opening 67 in the sides thereof. When the shaft 60 is revolved, the agitator causes the seed to fall through opening 64 to the bottom 11. The bent wings 62 (also revolving) carry the seed around the inner periphery of the bottom portion 12$^a$ to the opening 64, out through which it is forced, by the straightening of the wings, into spout 48, through which it drops to the ground.

Markers 68 are adjustably secured to reaches 69, pivoted to L-shaped brackets 70. These brackets are bolted to the side pieces of frame 1 and are adapted to engage the ends of springs 71 on reaches 69 when said reaches are raised. Projections 72 enable the operator to lift the reaches by pressing down on said projections with his feet. The seat 73 for the operator is located at the rear of the machine and is secured to the frame by a spring-support 74.

The operation of our machine is as follows: The levers 37 and 51 being in a forward position force the planting mechanism downward into engagement with the ground, dogs 58 serving to hold them in said position. As the machine is moved forward the disks 34 will open a furrow, into which fertilizer drops through spout 15. Disks 35 throw the dirt inward over the fertilizer, a ridge being formed which is leveled by sweep 45. This sweep serves not only to level the earth, but also to clear away any trash which may be likely to prevent the seed from falling into the trench which is made by the opener formed at the front of the blades of the sweep. The seed is dropped through spout 48 into the trench and is covered by the coverers 47, which drag along the side of the trench, throwing the dirt therein. After the seed is covered the earth above it is packed by roller 50. The moving parts of the seed-dropper and fertilizer-hopper are operated in the following manner: Main sprocket 21 is rotated by the traction-wheel 4. Chain 20 connects sprocket 21 with sprocket 17 and operates to revolve shaft 16, which in turn revolves sprockets 18 and 19, fixed thereon. Sprocket 18 revolves shaft 26 through chain 25 and a sprocket (not shown) located on said shaft. Sprocket 27 revolves with shaft 26, on which it is secured, and operates through chain 28$^a$ to revolve stirrer-shaft 28$^b$. The sprocket 19 connects the sprocket 29, secured to shaft 30. This shaft is provided with a beveled gear 31, which meshes with a similar gear 32, fixed to a shaft 60, upon which the spiders and agitators are mounted.

Having thus described our invention, what we claim as novel, and desire to secure by Letters Patent, is—

1. A seed-distributing mechanism comprising a hopper, a discharge-spout leading from said hopper, a plate spanning the hopper and having an opening formed therethrough, a rotative agitating-disk located above said plate and a seed-discharging member having a plurality of curved resilient arms which when straightened extend beyond the inner peripheral line of the hopper, said hopper having a discharge-opening formed in the side thereof near the bottom through which seed may be discharged into the spout.

2. A seed-distributing mechanism comprising a hopper, a spout secured to said hopper at one side thereof near the bottom, an opening formed through the side wall of the hopper to form communication between the interior of the hopper and the discharge-spout, a plate spanning the hopper above said discharge-opening and having an opening formed therethrough, an agitating-disk rotatably mounted above said plate and a seed-discharging device located below said plate and provided with a plurality of resilient arms, said arms when straightened being of such length as to extend beyond the wall of the hopper and through the discharge-opening thereof and means for imparting movement to said discharging device and said agitating-disk.

3. In a device of the character described, the combination with a hopper having a discharge-opening formed through the wall thereof near the bottom, a discharge-spout secured to said hopper, a plate spanning said hopper above the discharge-opening and having an opening therethrough, an agitating-disk located above said plate, a discharging device comprising a rotative hub carrying a plurality of resilient arms, the length of said arms and the radius of the hub being greater than the radius of the hopper and a shaft to which both the agitating-disk and the discharging device are secured.

4. In a device of the character described, the combination with a hopper having a false bottom and having an opening formed through said false bottom and also having a discharge-opening formed through the side wall thereof between the false bottom and the bottom proper, of an agitating-disk mounted for rotative movement immediately above the false bottom, a discharging-disk comprising a hub having a plurality of resilient arms which when straightened extend beyond the wall of the hopper, located between the false bottom and the bottom proper is a shaft to which both the agitating-disk and the discharging-disk are secured.

5. In a device of the character described, the combination with a circular hopper having a false bottom through which an opening is formed, said hopper having a discharge-opening formed through the side thereof between said false bottom and the bottom proper, of an agitating-disk located directly above said false bottom, a discharge-spout secured to the hopper adjacent the discharge-opening, a discharge mechanism comprising a hub carrying a plurality of resilient arms which when straightened extend beyond the wall of the hopper, a shaft to which both the agitating-disk and the discharge mechanism are secured, a frame upon which the hopper is mounted, wheels upon which said frame is mounted, connections between said wheels and the mechanism contained in said hopper for imparting movement to said mechanism.

In testimony whereof we affix our signatures in presence of two witnesses.

EPHRAIM B. HACKBURN.
WILLIAM C. WILLETT.
DENNIS F. DEPPE.

Witnesses:
HENRY G. WUNSCH,
C. D. HARVEY.